（12） United States Patent
Savicki et al.

(10) Patent No.: US 6,411,619 B1
(45) Date of Patent: Jun. 25, 2002

(54) REMOTELY RECONFIGURABLE SWITCHING NETWORK

(75) Inventors: Joseph Peter Savicki, Clinton; Andrew Schwartz, Morristown, both of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/165,714

(22) Filed: Oct. 2, 1998

(51) Int. Cl.[7] .............................................. H04L 12/50
(52) U.S. Cl. ...................................... 370/380; 370/888
(58) Field of Search ................................ 370/357, 360, 370/368, 375, 388, 16, 370, 380; 379/292, 291

(56) References Cited

U.S. PATENT DOCUMENTS

| | | | |
|---|---|---|---|
| 5,451,936 A | * 9/1995 | Yang et al. | ................. 340/826 |
| 5,524,154 A | * 6/1996 | Bergland et al. | .............. 385/17 |
| 6,002,692 A | * 12/1999 | Wills | ......................... 370/465 |

OTHER PUBLICATIONS

Benes, V.E., "On Rearrangeable Three–Stage Connecting Networks," *The Bell System Technical Journal*, vol. XLI, No. 5, pp. 1481–1492 (Sep. 1962).

Benes, V.E., "Optimal Rearrangeable Multistage Connecting Networks," *The Bell System Technical Journal*, pp. 1641–1656 (Jul. 1964).

Joel, A.E., "On Permutation Switching Networks," *The Bell System Technical Journal*, pp. 813–825, (May–Jun. 1968).

\* cited by examiner

*Primary Examiner*—Melvin Marcelo
*Assistant Examiner*—Ronald Abelson
(74) *Attorney, Agent, or Firm*—Brian Dinicola

(57) ABSTRACT

A remotely reconfigurable switching network including an N×N Benes switch having a plurality of stages of beta networks. The Benes switch is separated into a left half section and a right half section, with one of the sections having one less stage of beta networks than the other section. An additional stage of beta networks is connected to the section having one less stage of beta networks so that the stages of beta networks in the left and right half sections mirror one another. At least one attachment device is interposed between the left and right half sections. An adjunct device is connected to the attachment device to provide additional service simultaneously with original service. The remotely reconfigurable switching network requires less nodes and thus, is less costly and takes up less space than conventional switching networks.

9 Claims, 5 Drawing Sheets

200

200

REMOTELY RECONFIGURABLE SWITCHING NETWORK

FIELD OF THE INVENTION

The present invention is directed to a switching or connecting network, and in particular to a remotely reconfigurable switching network for a telephone system.

Remotely controllable "real" cross-connect switching networks such as the Remote Cable Pair Switching System (RECAPSS) or the Remote Pair Cross Connect System (REPACCS) manufactured by Remote Switch Systems, Inc. or the Smart-MDF product manufactured by OKI are well known and widely used as an interface to establish connections between input terminals and output terminals in a predetermined manner from a remote location. An example of a conventional "real" cross-point switching network is shown in FIGS. 1a and 1b. The network includes two cross-point switches 100, 150 each having N input lines running horizontally through the switch and N output lines running vertically through the switch. Switching elements 110, 160 represented by the small circles at the intersections of the input and output lines are placed at the nodes, that is the intersections or cross-points of the horizontal and vertical lines. Normally, the switching elements are in an open state with no connection between the input and output lines. A desired connection between an input and an output line may be formed by remotely controlling the switching element at the node where the two lines intersect. In this manner, any prescribed connection between input and output lines may be realized by remotely accessing the respective switching element.

"Real" cross-connect switching networks are commonly employed in the telecommunications industry wherein telephone subscribers are allowed to switch between local exchange carriers. Switching local carriers may require a physical rewiring or cross-connection between the subscriber's loop owned by the incumbent local exchange carrier (ILEC) and the network facilities of the competitive local exchange carriers (CLECs). In one specific application the switching network may be used to provide a particular type of service, for example, Asymmetric Digital Subscriber Loop (ADSL) service, to an existing plain old telephone service (POTS) subscriber loop served out of a central office. To provide additional services to the subscriber loop adjunct equipment 115 such as ADSL modems, line cards, diplexers and filters may be installed between the two switches 100, 150.

By way of example, in FIG. 1 the adjunct equipment 115 is installed only at output line #1. It should be noted, however, that additional adjunct equipment may be added to other output lines as the demand for such services among subscribers increases. The first switch 110 is used to connect a given input terminal of a subscriber requesting the particular service provided by the adjunct device 115 to output line #1. The signal from output line #1 is then split off and passes through the adjunct equipment 115 which provides the additional service, for example, ADSL service. In addition, the signal from output line #1 also passes through the second switch 150 that returns the signal lines to their original arrangement. This "real" cross-connect switching network is disadvantageous in that each switch requires a relatively large number of switching nodes which are expensive. In particular, an N×N switch has $N^2$ switching nodes, for example, in a 2×2 switch there are 4 switching nodes, in a 4×4 switch there are 16 switching nodes, and in an 8×8 switch there are 64 switching nodes.

V. E. Benes developed a switch described in "Optimal Rearrangeable Multistage Connecting Networks", The Bell System Technical Journal, pp. 1641–1656 (July 1964), incorporated herein by reference, that requires fewer switching nodes than a "real" cross-connect switch. The basic component of a Benes switch is a beta network, as shown in FIGS. 2a and 2b, including two relays, such as two double pole double throw (DPDT) latching relays. Beta network 200 has two input lines, "a", "b", and two output lines "c", "d", wherein the input and output lines are switchable between two states. In the first state shown in FIG. 2a input lines "a", "b" are directly connected to output lines "c", "d", respectively. In the second state shown in FIG. 2b, the lines are crossed, that is, input lines "a", "b" are connected to output lines "d", "c", respectively. It is clear that since two states can be achieved using a single beta network (Benes node) the number of nodes in the switch is reduced.

A plurality of beta networks may be arranged to form a Benes switch. By way of example, an 8×8 Benes switch 200 is shown in FIG. 2c. The 8×8 Benes switch includes 20 beta networks, as compared to 64 crosspoints in the prior art cross-connect switch. The 2×2 beta network is grown into a 4×4 Benes switch with three-stages of beta networks by duplicating the original switch and positioning the duplicated switch below the original switch. Specifically, the original 2×2 switch 210U is duplicated to form a lower switch 210L positioned below the upper switch. Then the appropriate number of additional input and output beta networks 215a–215d are connected to the inputs and outputs of the upper and lower switches. Each additional beta network has one output connected to the upper switch 210U and the other output connected to the lower switch 210L to create the 4×4 Benes switching network 230 with three stages of beta networks.

Similarly, an 8×8 Benes switching network may be created following the same procedure described above with respect to building the 4×4 Benes switch, except that the original or upper switch is now the 4×4 switch 230, instead of the 2×2 switch 210U. Specifically, the 4×4 Benes switch 230 is duplicated to form a lower switch 250 positioned directly below the upper switch. Then the appropriate number of additional input and output beta networks 205a–205h are connected to the inputs and outputs of the upper and lower switches. Each additional beta network 205a–205h has one output connected to the upper switch 230 and the other output connected to the lower switch 250 to form an 8×8 Benes switching network with five stages of beta networks. By following these basic steps the Benes network may be expanded as desired.

Benes switches may also be used to interconnect input and output terminals in order to provide additional services to predetermined subscribers. In a configuration similar to that described above with respect to cross-point switches, one or more adjunct devices may be disposed between two Benes switches. Specifically, the switching network includes a first Benes switch for selecting a particular subscriber to receive the additional service, an adjunct device connected to at least one output line of the first Benes switch to provide the necessary additional service capabilities depending on subscriber demand, and a second Benes switch connected to the output lines of the first Benes switch to return the signal lines to their original arrangement. This switching network is disadvantageous in that it still requires two Benes switches, each including a relatively large number of Benes nodes, and thus is relatively expensive to manufacture.

It is therefore desirable to develop a remotely accessible switching network that may be reconfigured to provide adjunct equipment specifically tailored to satisfy subscriber demand for a particular service while minimizing the number of switching nodes.

SUMMARY OF THE INVENTION

The present invention is directed to a remotely reconfigurable switching network. In a preferred embodiment the remotely reconfigurable N×N switching network includes an N×N Benes switch having a plurality of stages of beta networks. The Benes switch is separated into a left half section and a right half section, with one of the sections having one less stage of beta networks than the other section. An additional stage of beta networks is connected to the section having one less stage of beta networks so that the stages of beta networks in the left and right half sections mirror one another. In addition, at least one attachment device is interposed between the left and right half sections.

Furthermore, an exemplary embodiment of the present invention is a method for manufacturing a remotely reconfigurable switching network as described in the preceding paragraph. An N×N Benes switch, including a plurality of stages of beta networks, is separated into a left half section and a right half section, with one of the sections having one fewer stage of beta networks then the other section. Then an additional stage of beta networks is connected to the section having one less stage of beta networks so that the left and right half sections mirror one another. At least one attachment device is then inserted between the mirrored left and right sections.

BRIEF DESCRIPTION OF THE DRAWINGS

The foregoing and other features of the present invention will be more readily apparent from the following detailed description and drawings of an illustrative embodiment of the invention in which like reference numerals denote similar elements throughout the several views, and wherein.

DETAILED DESCRIPTION OF THE INVENTION

Figure 3:
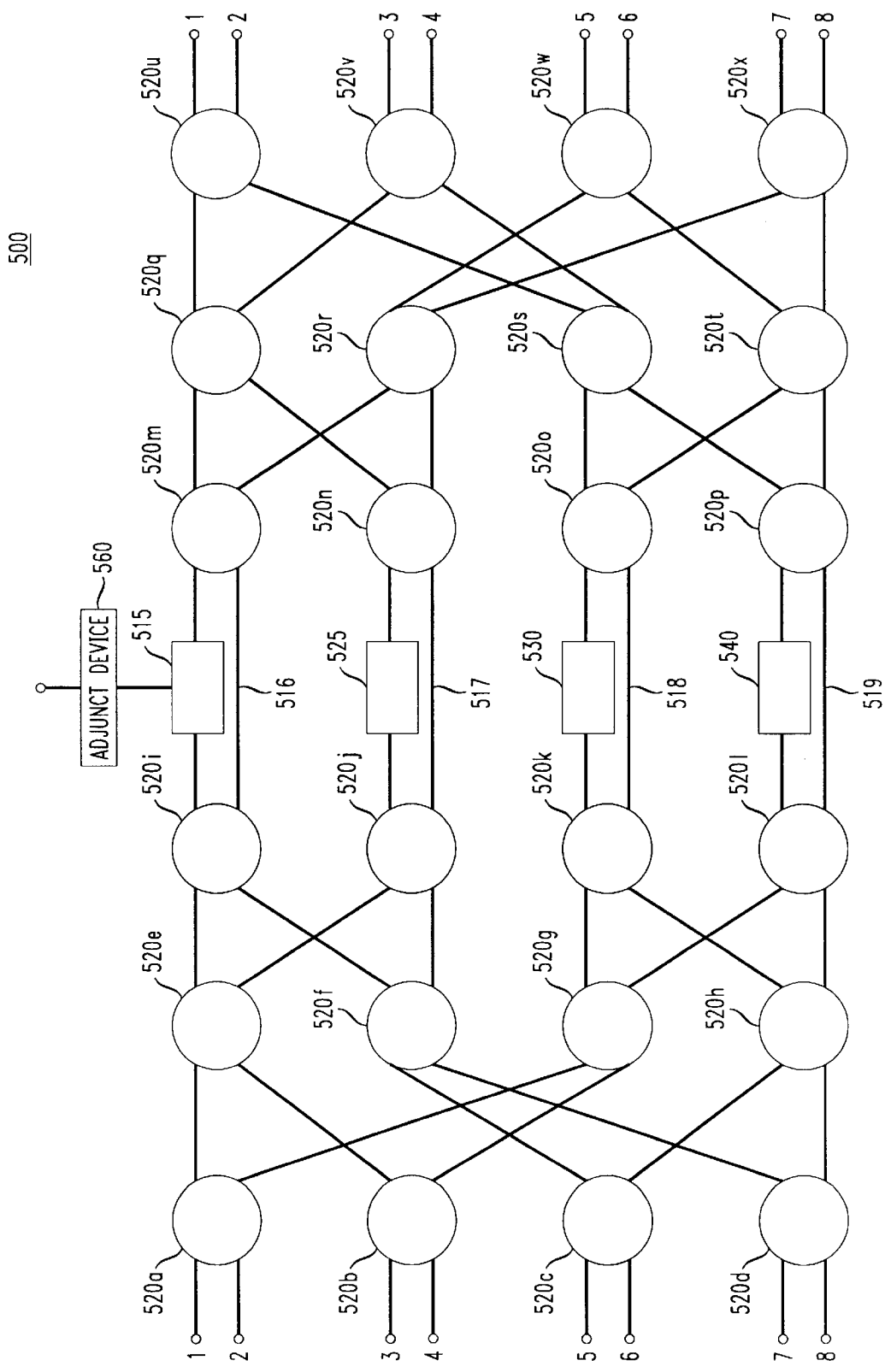
FIG. 3 is an example of an 8×8 switching network in accordance with the present invention.

By way of example, FIG. 3 shows an 8×8 switching network 500 in accordance with the present invention with one adjunct device 560. It should be noted that the inventive switching network may be built for any N×N switching network and that more than one adjunct device may be installed.

Figure 1A:
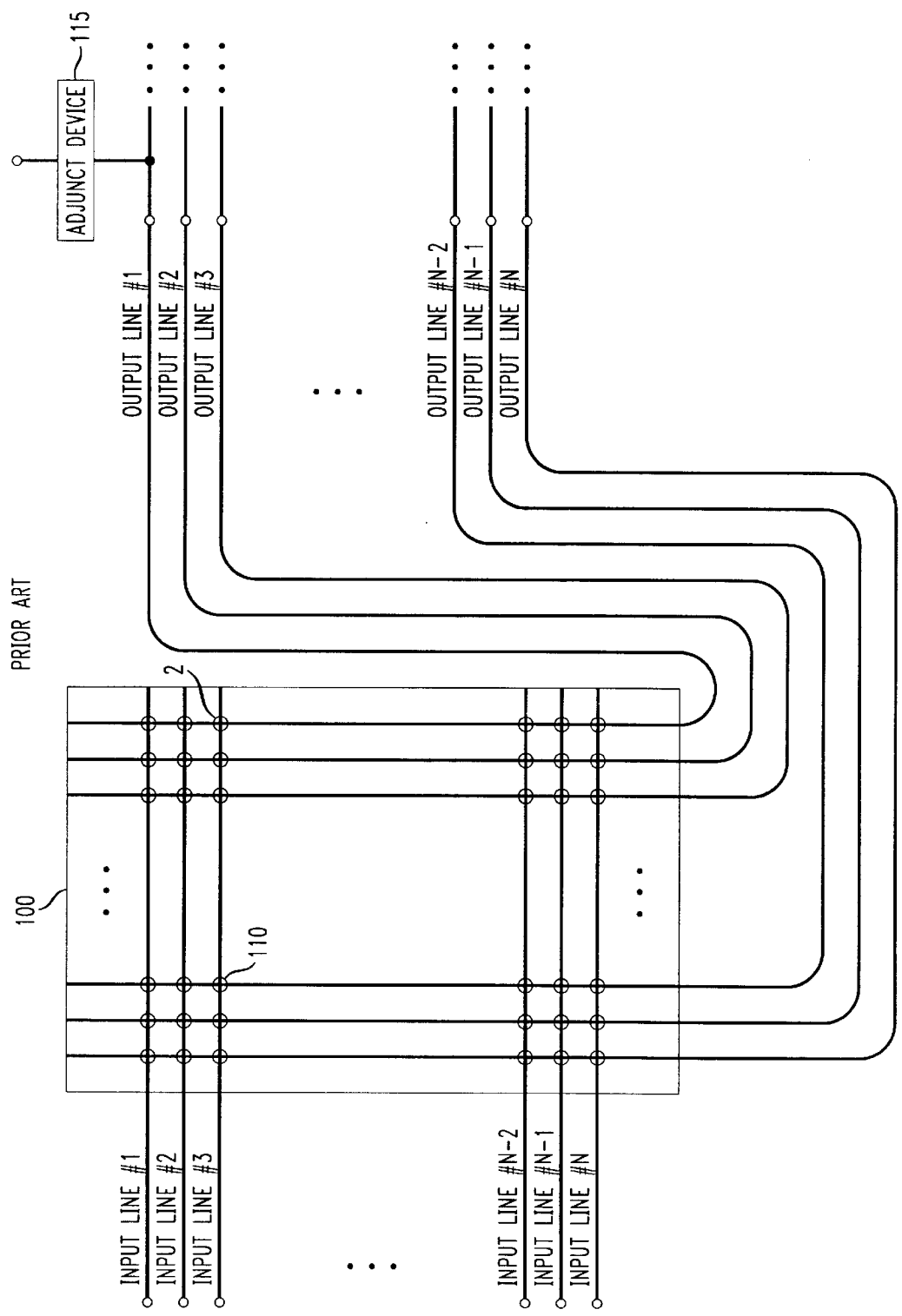
FIGS. 1a and 1b are an example of a prior art "real" cross-connect switching network.
Figure 1B:
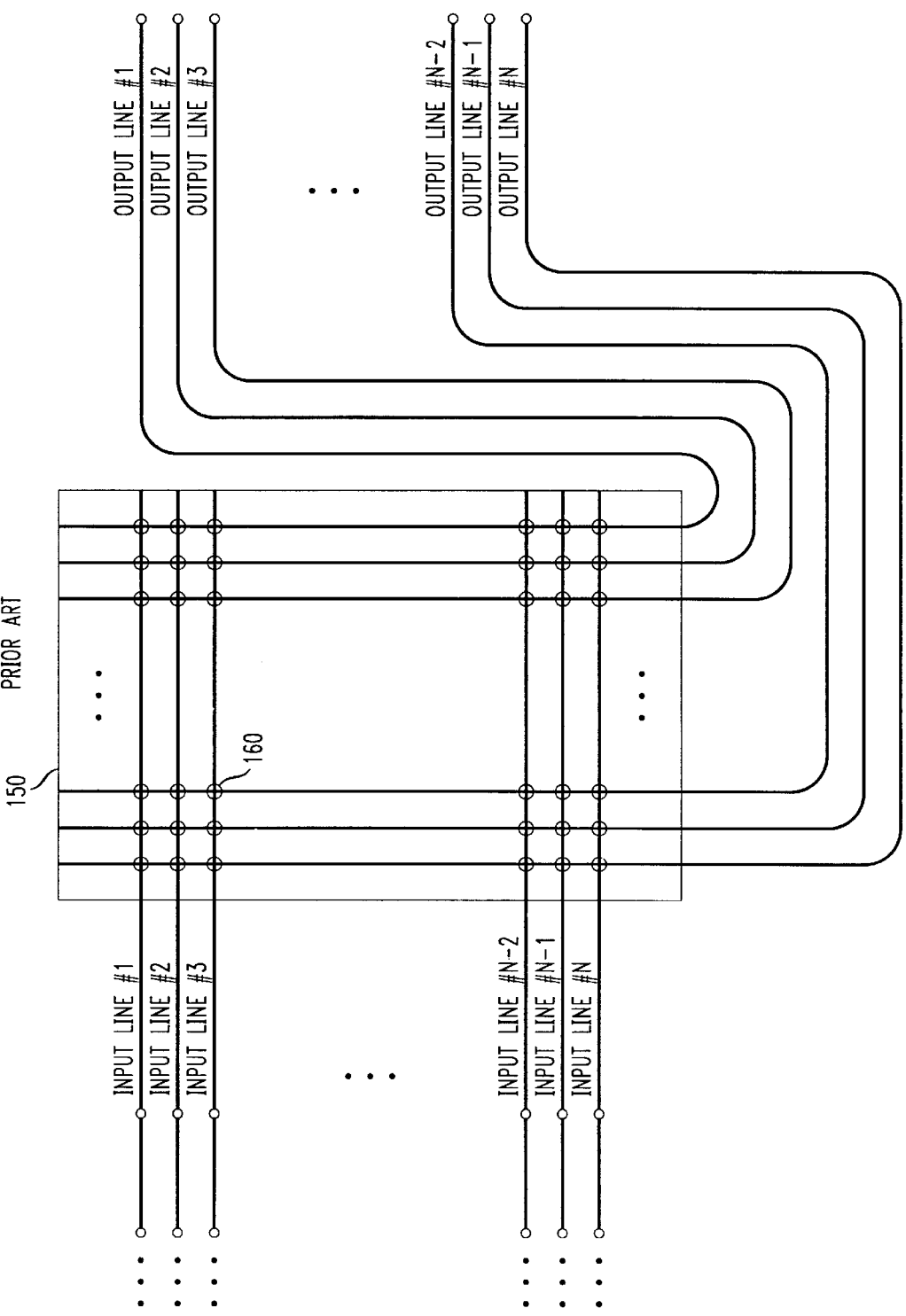
Figure 2A:
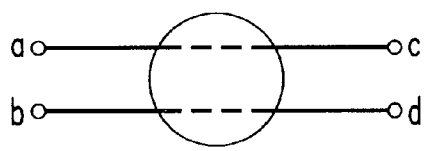
FIGS. 2a and 2b show the two output states of a prior art beta network.
Figure 2B:
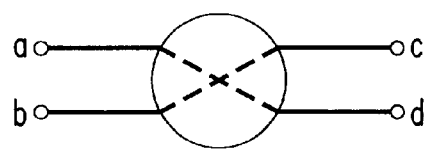
Figure 2C:
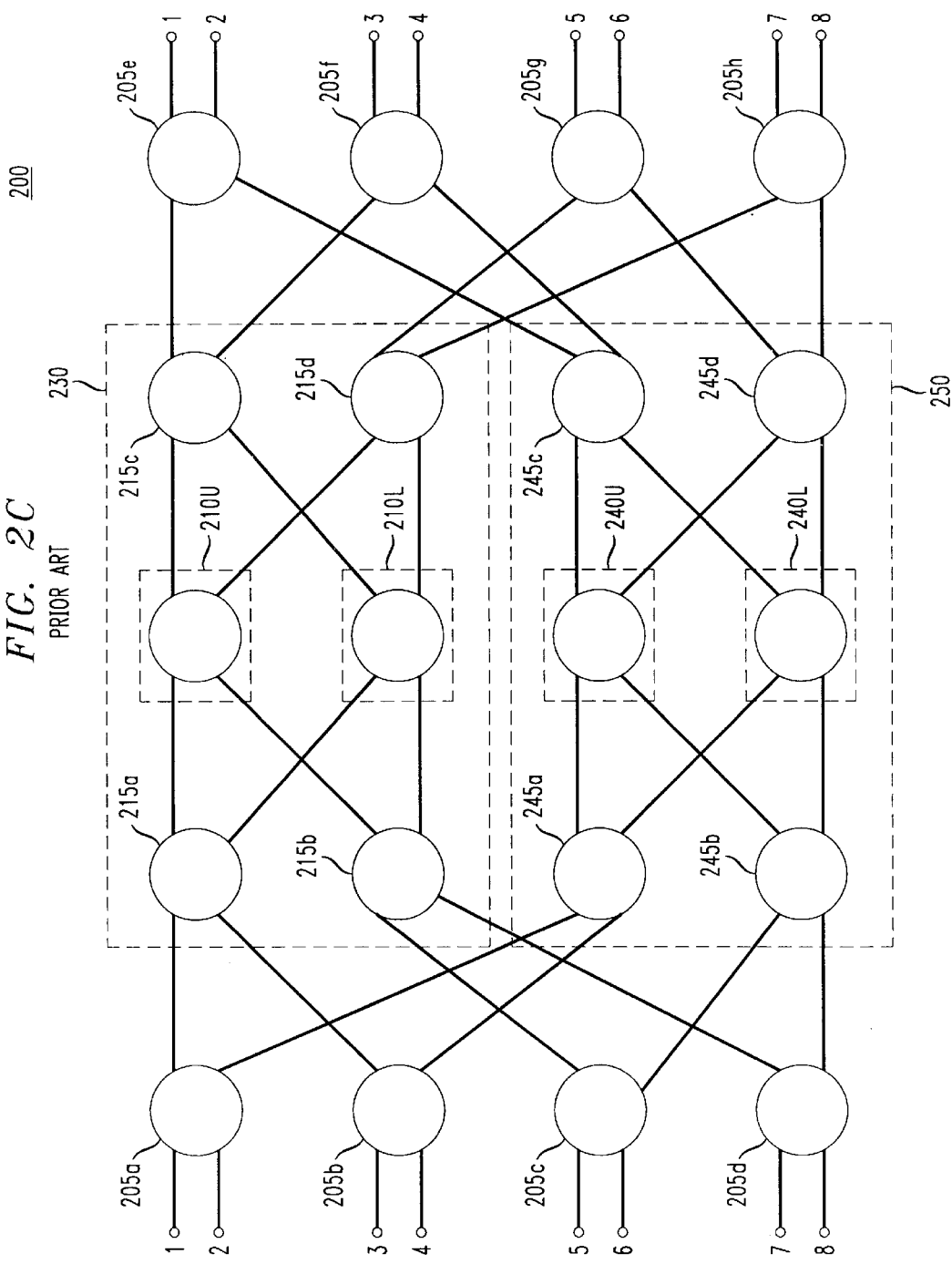
FIG. 2c is an example of a prior art 8×8 Benes switching network.

Switching network 500 is a modification of the prior art 8×8 Benes switching network 200 shown in FIG. 2c. Specifically, the 8×8 Benes switching network has been separated between the third and fourth stages of beta networks to form a left half section and a right half section, wherein the right half section has one less stage of beta networks than the left half section. Since the 8×8 Benes switch 200 in FIG. 2c has five stages of beta networks it can not be separated in a vertical direction into two equal halves. Therefore, the right half section comprising the first three stages of beta networks 520a–520l is slid to the left side and the right half section comprising the fourth and fifth stages of beta networks 520q–520x are slid to the right side. An additional stage of beta networks 520m–520p is connected to the right half section so that the right and left half sections mirror one another. In summary, the conventional 8×8 Benes switching network with five stages of beta networks is modified to an 8×8 switching network having six stages of beta networks.

Interposed between the left and right half sections is at least, one attachment device such as a jumper. In a preferred embodiment shown in FIG. 3, four attachment devices 515, 525, 530, 540 are disposed between the third and fourth stages of beta networks. Although four attachment devices are shown as many as, eight or as few as one attachment device may be installed. In general, in an N×N switching network in accordance with the present invention having N inputs and N outputs, a maximum of N attachment devices may be installed. These attachment devices provide points of connection for at least one adjunct device such as an ADSL modem, line cards, diplexers and filters. Additional adjunct devices may be installed as subscriber demand increases.

In the preferred embodiment shown in FIG. 3, the attachment devices 515, 525, 530, 540 are disposed between the first output terminal of each beta network in the third stage and the first input terminal of each beta network in the fourth stage, while the second output terminal of each beta network in the third stage is directly connected to the second input terminal of each beta network in the fourth stage. By arranging the adjunct device in this manner, the original service and additional service performed by the adjunct equipment may be simultaneously provided to the subscriber.

In the 8×8 switching network in FIG. 3, initially one adjunct device may satisfy subscriber requests for the additional service. The states of the beta networks may be controlled so that at a predetermined point in time any one of the input terminals representing different subscribers may be connected to the adjunct device 560. By way of example, if the additional service provided by the adjunct device 560 is requested by the subscriber connected to input terminal #6, the states of the beta networks in the first three stages of the switching network are controlled via a system controller (not shown) to force the signal at input terminal #6 to be routed to attachment device 515 and be processed by the adjunct equipment 560 connected thereto. In addition, the system controller is used to set the states of the beta networks in the fourth, fifth and sixth stages so that the original signal passing through the attachment device is routed to output terminal #6. In this way, the sequencing of subscribers is maintained between the input and output terminals of the switching network.

Since a single adjunct device can provide service to only one subscriber at any given time, additional adjunct devices must be connected to the switching network as demand for the additional service increases. In the switching network shown in FIG. 3, a maximum of four adjunct devices may be connected to the switching network, that is, one adjunct device may be connected to each of attachment devices 515, 525, 530, 540. Additional adjunct devices are preferably added to the switching network, in a predetermined manner. If the first adjunct device 560 is connected to one of the attachment devices 515, 525 in the upper half of the switching network then the second adjunct device is preferably connected to one of the attachment devices 530, 540 in the lower half of the switching network. It is advantageous to connect the second adjunct device in this manner because the first adjunct device 560 can provide additional service to only one of the four subscribers connected to the first four input terminals. Thus, by installing the second adjunct device at one of the attachment devices in the lower half of the switching network, additional service is guaranteed even if two of the first four subscribers simultaneously request the additional service. The remaining two adjunct devices should be added at attachment devices 525 or 540. In summary, the adjunct devices are preferably added to the existing switching network so that they are approximately equal in number between the upper and lower halves of the switching network.

A comparison of the conventional Benes switching network in FIG. 2c and the inventive switching network in FIG. 3 clearly shows the significant reduction in the number of nodes. Specifically, use of the prior art 8×8 Benes switching network to connect subscribers to adjunct devices while simultaneously providing original service requires two 8×8 Benes switches each having 20 nodes for a total of 40 nodes. In comparison, the inventive 8×8 switching network requires only a single switch having 24 nodes. This reduction in the number of nodes significantly reduces the overall cost and size of the switching network.

The inventive switching network is particularly suitable for telecommunications or other fields wherein specialized equipment is to be tied into specific facilities. For example, in the telecommunications application the inventive switching network may be used to connect a limited number of test heads to a loop access matrix in order to test a relatively large number of loops.

Thus, while there have been shown, described and pointed out fundamental novel features of the invention as applied to preferred embodiments thereof, it will be understood that various omissions, substitutions and changes in the form and details of the devices illustrated, and in their operation, may be made by those skilled in the art without departing from the spirit and scope of the invention. For example, it is expressly intended that all combinations of those elements and/or method steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A remotely reconfigurable N×N switching network comprising:

an N×N Benes switch having N inputs and N outputs, said Benes switch including a plurality of stages of beta networks, said Benes switch being separated into a first section and a second section, the second section having one less stage of beta networks than the first section; and an additional stage of beta networks connected to the second section, each beta network in the additional stage being connected along a first line directly to a corresponding beta network in the first section, and a second line connecting each beta network in the additional stage to a corresponding beta network in the first section with at least one attachment device interposed therebetween, said attachment device being adapted for connection to eat least one adjunct device.

2. A switching network in accordance with claim 1, further comprising an adjunct device connected to said attachment device.

3. A switching network in accordance with claim 2, wherein said adjunct device is one of an Asymmetric Digital Subscriber Loop modem, a line card, a diplexer, and a filter.

4. A switching network in accordance with claim 1, wherein said attachment device is a jumper.

5. A switching network in accordance with claim 1, wherein a maximum of N attachment devices are interposed, between the first and second sections.

6. A method of manufacturing a remotely reconfigurable N×N switching network, comprising the steps of:

separating an N×N Benes switch, including a plurality of stages of beta networks, into a left half section and a right half section, one of the sections having one fewer stage of beta networks then the other section;

connecting an additional stage of beta networks to the section having one less stage of beta networks so that the left and right half sections mirror one another; and inserting at least one attachment device along a second line which interconnects the mirrored left and right sections.

7. A method in accordance with claim 6, further comprising the step of attaching an adjunct device to said attachment device to provide additional service.

8. A method in accordance with claim 5, further comprising the step of controlling an output state of each beta network in the mirrored left and right half sections so that sequencing of input terminals of the left half section and output terminals of the right half section is maintained.

9. A method of manufacturing a remotely reconfigurable N×N switching network, compromising the steps of:

separating an N×N Benes switch, including a plurality of stages of beta networks, into a first section and a second section, the second section having one fewer stage of beta networks than the first section;

connecting an additional stage of beta networks to the second section, each beta network in the additional stage being connected along a first line directly to a corresponding beta network in the first section, and a second line connecting each beta network in the additional stage to a corresponding beta network in the first section with at least one attachment device interposed therebetween, said attachment device being adapted for connection to at least one adjunct device; and inserting at least one attachment device along a second line connecting each beta network in the additional stage to a corresponding beta network in the first section, said attachment device being adapted for connection to at least one adjunct device.

* * * * *